United States Patent
Aime et al.

(10) Patent No.: US 12,044,630 B2
(45) Date of Patent: Jul. 23, 2024

(54) AUTOMATIC SYSTEM FOR BLADE INSPECTION

(71) Applicant: FASPAR S.p.A., Milan (IT)

(72) Inventors: Paolo Ottavio Aime, Milan (IT); Maddalena Lucia Aime, Milan (IT); Alessandro Grassi, Milan (IT)

(73) Assignee: Faspar S.P.A., Milan (IT)

( * ) Notice: Subject to any disclaimer, the term of this patent is extended or adjusted under 35 U.S.C. 154(b) by 311 days.

(21) Appl. No.: 17/425,307

(22) PCT Filed: Jan. 24, 2020

(86) PCT No.: PCT/IB2020/050566
§ 371 (c)(1),
(2) Date: Jul. 22, 2021

(87) PCT Pub. No.: WO2020/152642
PCT Pub. Date: Jul. 30, 2020

(65) Prior Publication Data
US 2022/0099591 A1  Mar. 31, 2022

(30) Foreign Application Priority Data
Jan. 24, 2019  (IT) ......................... 102019000001053

(51) Int. Cl.
*G01N 21/95* (2006.01)
*B23Q 17/09* (2006.01)
(Continued)

(52) U.S. Cl.
CPC ......... *G01N 21/95* (2013.01); *B23Q 17/0995* (2013.01); *G01N 35/10* (2013.01);
(Continued)

(58) Field of Classification Search
CPC .. G01N 21/95; G01N 35/10; G01N 2201/021; G01N 2201/06113;
(Continued)

(56) References Cited

U.S. PATENT DOCUMENTS 3,541,906 A    11/1970  Sederberg et al.
4,583,854 A *  4/1986   Lozar ..................... G01N 21/88
                                                           250/234
(Continued)

FOREIGN PATENT DOCUMENTS

EP    3118575 A1 *  1/2017  ............. B24B 3/368
JP    H0572356 U    10/1993
(Continued)

OTHER PUBLICATIONS

Chang, WT., Su, CH., Guo, DX. et al. Automated optical inspection for the runout tolerance of circular saw blades. Int J Adv Manuf Technol 66, 565-582 (2013). https://doi.org/10.1007/s00170-012-4350-6 (Year: 2012).*

*Primary Examiner* — Edmond C Lau
*Assistant Examiner* — Noah J. Haney
(74) *Attorney, Agent, or Firm* — LOZA & LOZA LLP

(57) ABSTRACT

An automatic system for inspecting a cutting edge of a ring shaped blade. An example system includes one supporting and moving group rotatably mounted around one rotation axis and configured to support the ring shaped blade between at least one parking position and at least one reading position, one first emitting unit configured to emit at least one first inspection light beam, one second emitting unit configured to emit at least one second inspection light beam, one first detecting unit configured to detect a first light beam reflected from the ring shaped blade, and one second detecting unit configured to detect a second light beam reflected from the ring shaped blade, and one control and processing unit configured to receive an input and process at (Continued)

least one detection signal and output at least one quality index of the cutting edge of the ring shaped blade.

20 Claims, 6 Drawing Sheets

(51) Int. Cl.
  *B23Q 17/24* (2006.01)
  *G01N 35/10* (2006.01)
  *G05B 19/4065* (2006.01)

(52) U.S. Cl.
  CPC ...... *G05B 19/4065* (2013.01); *B23Q 17/2457* (2013.01); *G01N 2201/021* (2013.01); *G01N 2201/06113* (2013.01); *G01N 2201/062* (2013.01); *G05B 2219/37228* (2013.01); *G05B 2219/37252* (2013.01); *G05B 2219/37256* (2013.01); *G05B 2219/45159* (2013.01); *G05B 2219/50203* (2013.01)

(58) Field of Classification Search
  CPC .......... G01N 2201/062; B23Q 17/0995; B23Q 17/2457; G05B 19/4065; G05B 2219/37228; G05B 2219/37252; G05B 2219/37256; G05B 2219/45159; G05B 2219/50203
  USPC .......................................................... 356/69
  See application file for complete search history.

(56) References Cited

U.S. PATENT DOCUMENTS

| | | | |
|---|---|---|---|
| 2007/0217673 A1 | 9/2007 | Stimpson et al. | |
| 2009/0244528 A1* | 10/2009 | Suzuki | G01N 3/56 356/237.2 |
| 2012/0163930 A1 | 6/2012 | Jeyaraman et al. | |
| 2012/0242827 A1* | 9/2012 | Chang | G01B 11/08 348/92 |

FOREIGN PATENT DOCUMENTS

| | | | | |
|---|---|---|---|---|
| JP | 2007017276 A | * | 1/2007 | ............ G01B 11/24 |
| JP | 2009083072 A | * | 4/2009 | ............ B23Q 17/24 |
| JP | 2016221629 A | * | 12/2016 | ........... B26D 1/0006 |
| KR | 101878630 B1 | | 7/2018 | |

* cited by examiner

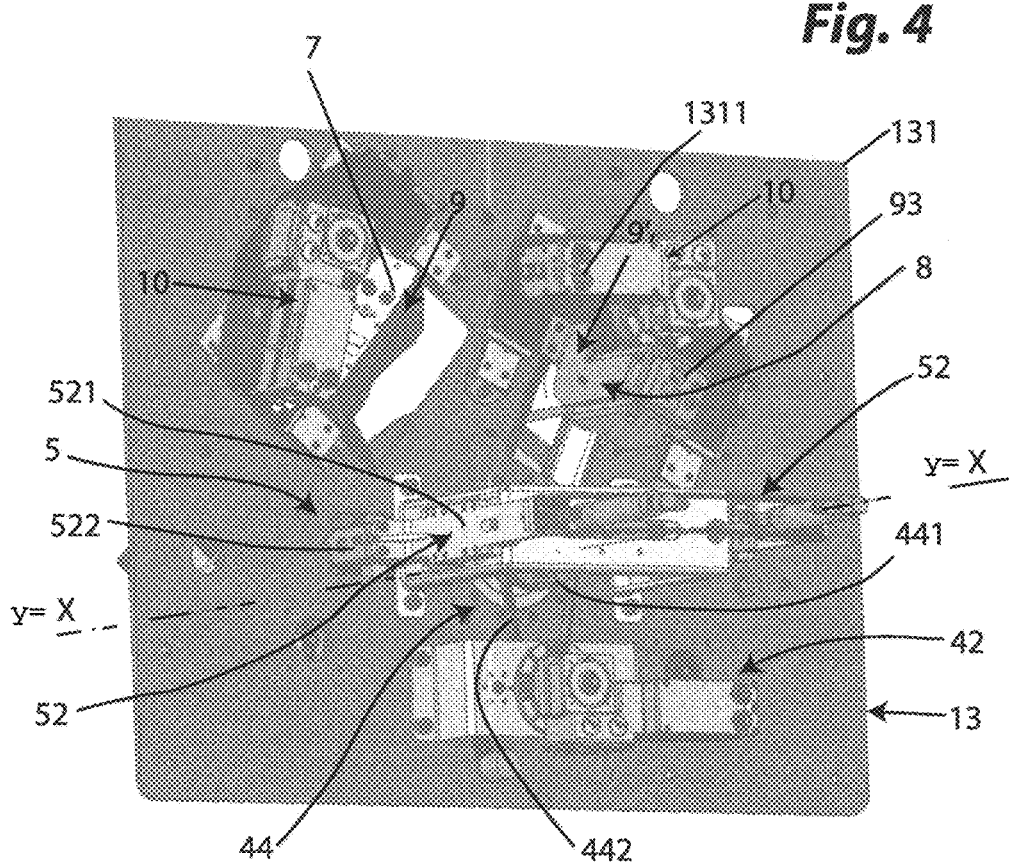

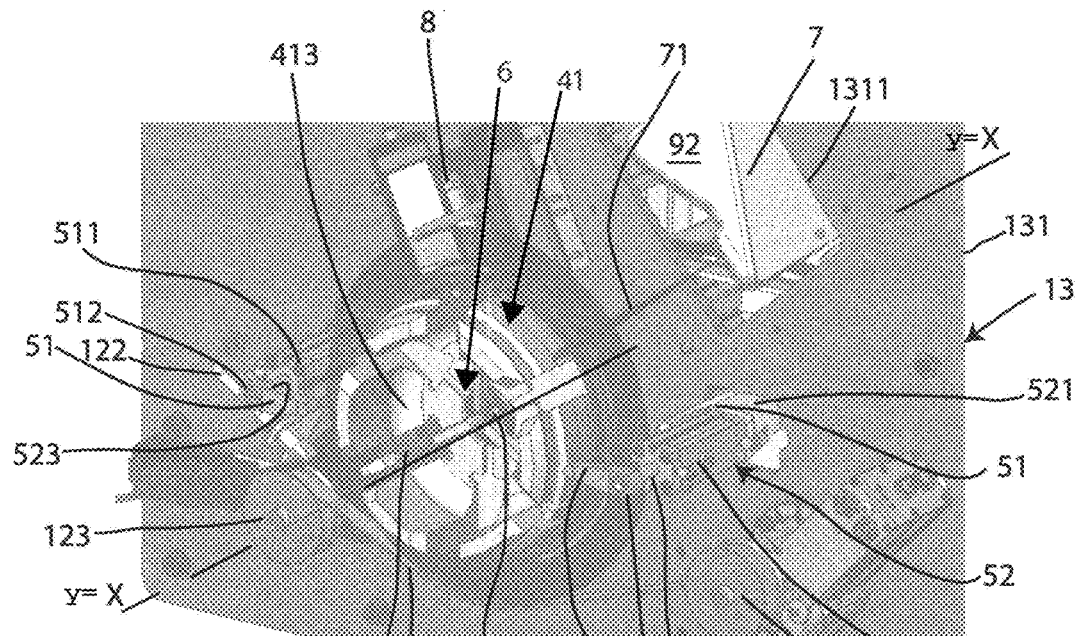
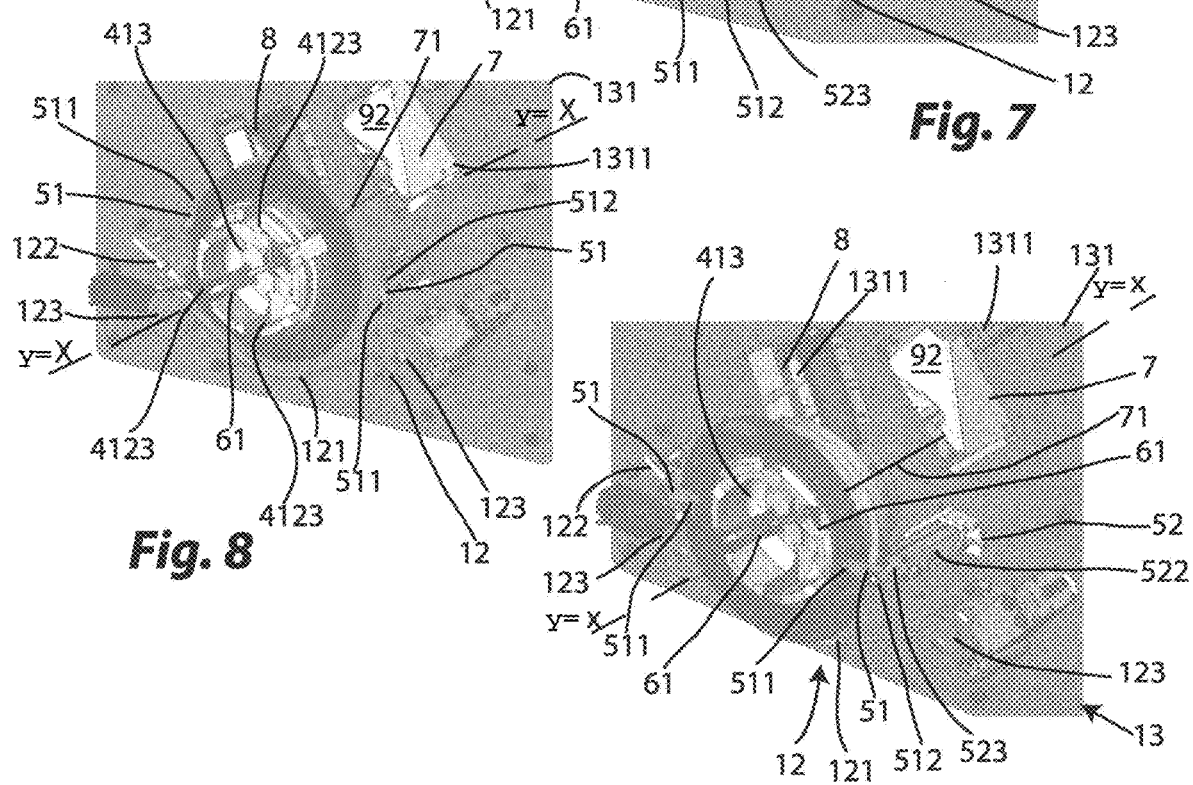
Fig. 7
Fig. 8
Fig. 9

AUTOMATIC SYSTEM FOR BLADE INSPECTION

BACKGROUND OF THE INVENTION

Field of the Invention

The present invention relates to the field of dimensional measuring instruments of optical type configured for checking the quality of the cutting edge of a blade, for example of the type used for "slitter" plants, which notoriously are dedicated to the separation of sheets of metal material wound in coils, with a cut parallel to the length of the sheet, through the use of opposed circular rotating blades, having the form of a ring.

Description of Related Art

It is known that during their normal use, the blades are subject to wear and/or possible accidental breakage of the cutting edge and that a compromised cutting edge provides for a poor quality to the worked product, which is why the scheduling of operations for inspecting the quality of the edge of the blades used in this type of processing is essential.

At present, assessment of the quality of the cutting edge of a blade can be performed indirectly, for example through an analysis of the product worked with such a blade, whereby if the cut performed on the worked product is not accurate or if an imperfection on its perimeter is cyclically noted, it can be concluded that the cutting edge of the blade is damaged or otherwise inadequate for the purpose. Alternatively, assessment of the quality of the edge of a blade can be performed directly, for example with expert operators that, by watching and tapping the cutting edge of the blade, assess the status of the same. These assessment modes are clearly unreliable, non-quantitative and inconvenient to implement.

According to a further variant, the assessment of the quality of the edge of blades may be performed through applications that use a video camera either applied on a motorised axis or a fixed video camera. Often, these applications are not on board but require to be bench executed, are limited to the quantification of one feature only of the cutting blade under investigation, for example the cutting angle of said blade edge or the continuity of the same. In this case also, these solutions are unpractical to be implemented and poorly informative.

KR101878630, for example, describes a system for inspection of a cutting element, comprising a carousel support, configured for moving one cutting element between three detecting stations, each detecting station being provided with a single group for detecting a light beam reflected by the cutting element under inspection. US2007217673 discloses a prior art system for detecting the presence or absence of an object.

The need to provide for a system allowing inspection of the quality of a cutting edge of a blade in an effective, accurate, easy to implement and inexpensive way is felt.

The main object of the present invention is, therefore, to provide for a system for inspecting a cutting edge of a blade, which is alternative to traditional systems and allows assessing the quality of the cutting edge of the blade, both in terms of cutting angle and continuity of the cutting edge under investigation, in a precise and effective way.

Yet another object of the present invention is o provide for a system for inspecting the cutting edge of a blade that is practical to be implemented and allows to quickly obtain reliable results regarding the quality of the cutting edge of the blade under investigation.

BRIEF SUMMARY OF THE INVENTION

It is a specific object of the present invention an automatic system configured for inspecting one cutting edge of a blade, comprising:
one supporting and moving group, configured to support said blade between at least one parking position and at least one reading position and put it in rotation around at least one rotation axis;
one first emitting group, configured to emit at least one first inspection light beam toward said supporting and moving group and toward said cutting edge of said blade, when said blade is supported by said supporting and moving group;
one second emitting group, configured to emit at least one second inspection light beam toward said supporting and moving group and toward said cutting edge of said blade, when said blade is supported by said supporting and moving group;
one first detecting group, configured to detect a first light beam reflected from said blade, when said first inspection light beam is emitted toward said blade and
one second detecting group, configured to detect a second light beam reflected from said blade, when said second inspection light beam is emitted toward said blade,
said first detecting group and said second detecting group being configured to output at least one respective detection signal;
one control and processing unit operatively connected to said supporting and moving group, said first emitting group, said second emitting group, said first detesting group and to said second detecting group, configured to receive in input and process said at least one detection signal, and output at least one quality index of the cutting edge of said blade.

According to another aspect of the invention, said supporting and moving group can comprise:
one support element, configured to support said blade;
one shaft orthogonally rigidly fixed to said first support element along said at least one rotation axis;
one gear motor group, operatively connected to said at least one shaft, whereby the activation of said gear motor group drags into rotation said shaft and the support element integral thereto, around said at least one rotation axis.

According to a further aspect of the invention, said support element can comprise:
one plate, configured to be rigidly connected to said shaft, and
one peripheral wall, extending from said plate, opposite with respect to said shaft, said peripheral wall having one free distal portion and one proximal portion for connection with said plate, whereby said blade can be placed on said support element in said parking position, on said at least one peripheral wall at said free distal portion, and can be moved toward said reading position, at said connection proximal portion of said peripheral wall.

According to an additional aspect of the invention, said system can comprise at least one positioning group, configured to move said blade between said at least one parking position and said at least one reading position, comprising:
one pair of engaging arms, located on the opposite side with respect to said supporting and moving group, wherein each engaging arm of the pair of engaging arms includes at least one engaging portion and is configured to be movable between one engagement position, at which said engaging portion of each engaging arm can touch said blade, and one disengagement position, at which said engaging portion of each engaging arm cannot touch said blade;

one pair of shifting elements, wherein each shifting element of the pair of shifting elements is connected to one respective engaging arms of the pair of engaging arms and is configured to shift the respective engaging arm along one direction parallel to said at least one rotation axis, whereby when each engaging arm of the pair of engaging arms (is in the engagement position it can touch said blade, if the blade is mounted on said at least one supporting and moving group and, after one shift by the respective shifting element it can move said blade between said parking position and said reading position.

According to another aspect of the invention, said pair of shifting elements can comprise:

at least one pair of guides, each arranged parallel to said at least one shaft, at least one pair of slides, each capable of sliding along one respective guide of said pair of guides;

at least one pin, on one side hinged on one respective slide and on the other side rigidly connected to one respective engaging arm, said pair of engaging arms, optionally at one portion of said engaging arm opposite to said engaging portion, each engaging arm thus being connected to the respective pin and being therefore able to rotate between said engagement position and said disengagement position, when the pin to which it is connected rotates correspondingly.

According to a further aspect of the invention, said system can include locking elements, configured to lock in position said blade, when supported by said supporting and moving group, at said reading position, by moving between at least one rest position wherein they do not interfere with said blade and at least one locking position, wherein they lock in position said blade, said locking elements being able to optionally comprise at least one plurality of self-centering jaws housed in a housing seat comprised between said plate and said peripheral wall of said support element, within said peripheral wall being formed one plurality of recesses, wherein said jaws of said plurality of self-centering jaws can be displaced between said rest position, wherein they are included within said housing seat, and said locking position, wherein each is inserted in one respective recess of said plurality of recesses in such a way as to radially extend beyond said peripheral wall, thereby locking in position said blade.

According to an additional aspect of the invention, said first inspection light beam can be a laser beam which strikes said blade, at said at least one cutting edge, according to an angle comprised between 35° and 55°, optionally comprised between 40° and 50°, even more optionally equal to approximately 45°, with respect to one direction normal to one face of said blade facing said first emitting group and being delimited by said cutting edge under investigation.

According to another aspect of the invention, said first detecting unit can comprise at least one first camera configured to detect said first laser light beam reflected by the surface of said blade hit by said first inspection light beam and generate one first detection signal, in the form of at least one image, which can be optionally correlated to the degree of inclination of the impression left by said at least one laser beam hitting the surface of said blade.

According to a further aspect of the invention, said second inspection light beam can be a LED beam configured to strike said blade, at said at least one surface having its cutting edge, according to one angle optionally not greater than 45°, more optionally not greater than 30', even more optionally not greater than 20°, with respect to one direction normal to one face of said blade facing said second emitting group and delimited by said cutting edge under investigation.

According to an additional aspect of the invention, said second detecting unit can comprise at least one second camera configured to detect said second light beam reflected by the surface of said blade hit by said second inspection light beam and generate said at least one second detection signal, in the form of at least one image, optionally correlated to the extension of defects on the surface of said blade.

According to another aspect of the invention, said system can comprise an adjustment group (10) of the distance and inclination of said first detecting unit and/or said second detecting unit with respect to said supporting and moving group, said first detecting group and said second detecting group being configured so as to be positioned each at a focal distance, which distance is configured for the correct acquisition of said first reflected light beam and said second reflected light beam, based on the dimensions of said blade.

According to a further aspect of the invention, said system can comprise one cleaning group configured to clean said blade when supported by said supporting and moving group, said cleaning group comprising:

one belt configured to enter into contact with said blade, when supported by said supporting and moving group in said reading position; and one air delivering element, configured to deliver at least one air flow, optionally of the lamellar type, toward said blade.

According to an additional aspect of the invention, said at least one belt can be supported at each end thereof by a respective motorized roller, whereby based on the mutual rotation of each roller, said belt can move from one working configuration, wherein it enters into contact with said cutting edge of said blade (3), to one rest configuration, wherein the belt does not touch said cutting edge.

According to another aspect of the invention, said system can comprise one supporting frame having one fixed portion, said fixed portion being configured to support said supporting and moving group, said positioning group, said locking elements, said first emitting group, said second emitting group (8), said first detecting group, said second detecting group and, when provided, also said adjustment group and/or said cleaning group, said first emitting group, said second emitting group being configured to emit said first inspection light beam and said second inspection light beam, respectively, toward said cutting edge of said blade facing said fixed portion of the supporting frame, in said fixed portion being optionally formed respective through openings for said first emitting group and said second emitting group.

According to a further aspect of the invention, said system can comprise one supporting frame having one fixed portion and at least one movable portion with respect to said fixed portion, said fixed portion being configured to support said supporting and moving group, said positioning group, said locking elements and, when provided, also said cleaning group, and said movable portion being configured to support at least said first emitting group, said second emitting group, said first detecting group, said second detecting group, and, when provided, also said adjustment group, whereby said first emitting group and said second emitting group emit said first inspection light beam and said second inspection light beam, respectively, toward the other cutting edge of said blade, which faces away from said fixed portion of the supporting frame.

BRIEF DESCRIPTION OF THE SEVERAL VIEWS OF THE DRAWINGS

The present invention will be now described, for illustrative but not limiting purposes, according to its preferred embodiments, with particular reference to the Figures of the accompanying drawings, wherein:

FIG. 4 shows a rear not scaled perspective view of FIG. 3;

FIGS. 5 to 9 are not scaled perspective views of a lower front portion of the system of FIG. 3, during execution of respective steps of the inspection method according to the invention;

In the enclosed Figures the same reference numerals will be used for similar elements.

DETAILED DESCRIPTION OF THE INVENTION

Figure 1:
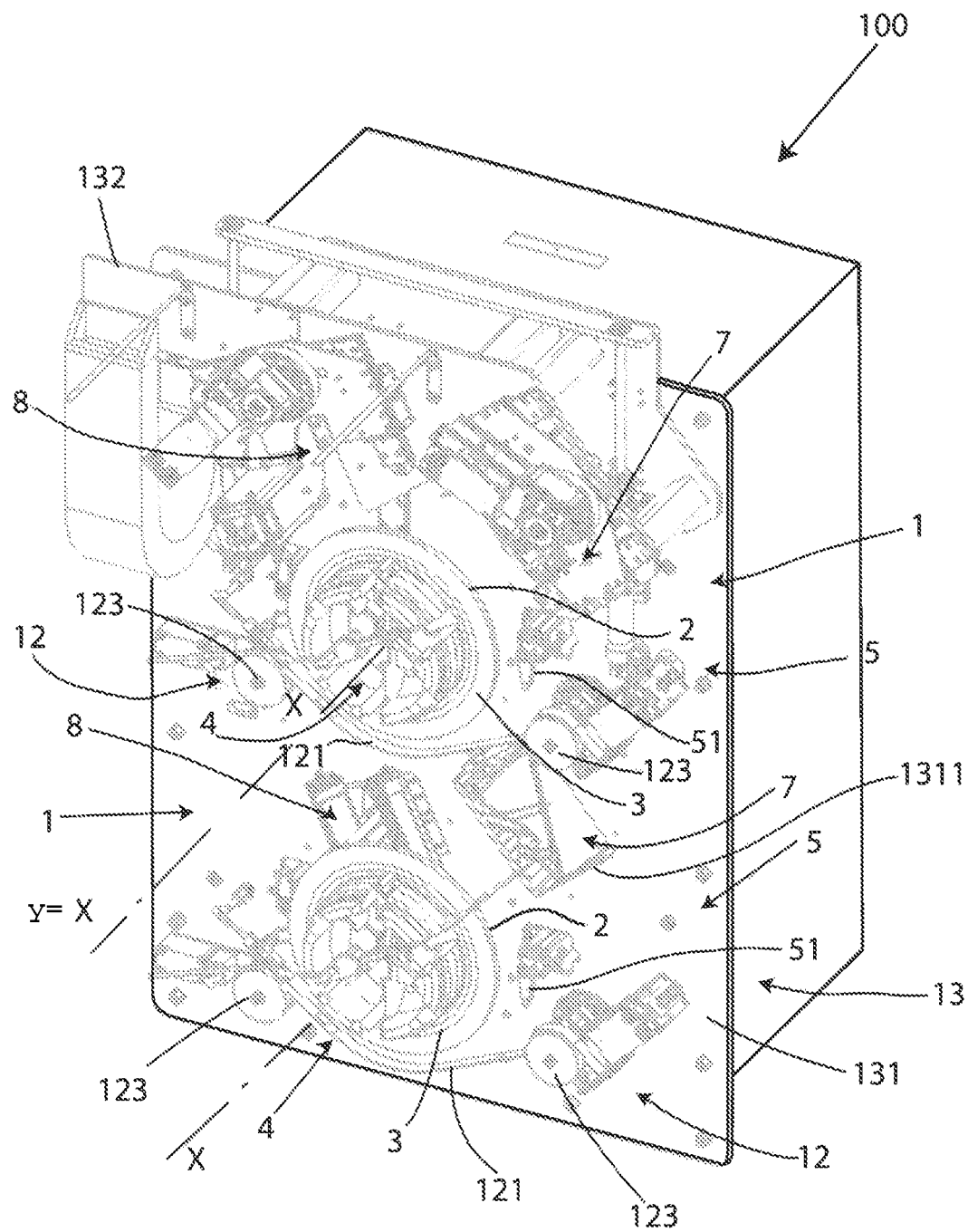
FIG. 1 shows a perspective elevation view of a system according to the invention.
Figure 2:
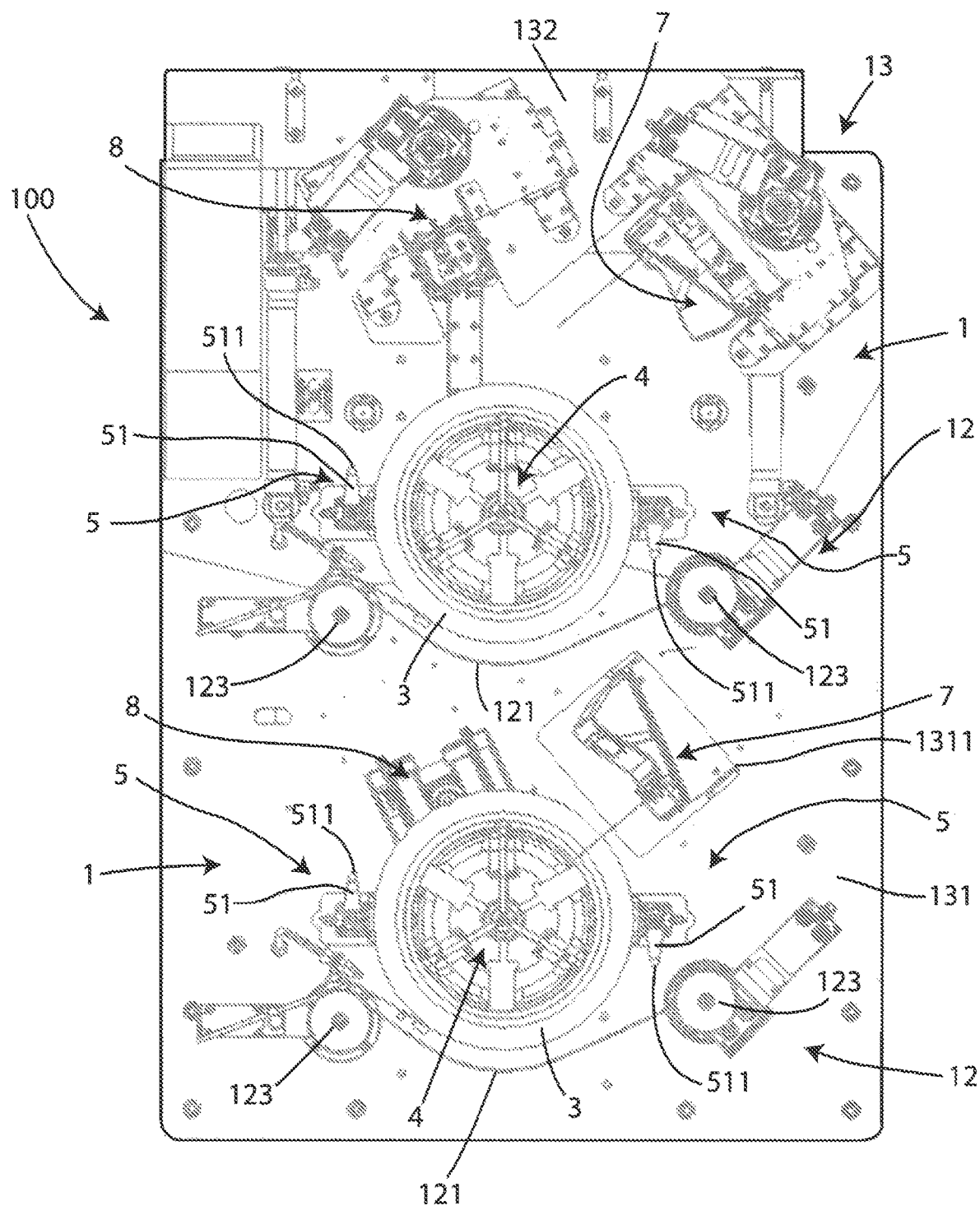
FIG. 2 is a front view of the inspection system of FIG. 1.

Before going into the merits of the present invention is pointed out that terms "upper", "lower", "front", "rear" are used in the present description and in the following claims, for the sole purpose of facilitating the comprehension of the invention and are in no way to be construed as limiting therefor. For clarity, these terms refer to the layout of the system according to the invention, as shown in FIG. 1, but it is obvious that the teachings provided by the invention would remain valid, mutatis mutandis, even if the system was arranged differently, for example substantially "horizontally".

It is also be noted that with the term "ring shaped" blade it is meant, in the present description and in the following claims, one blade having a plan view configuration substantially in the form of an annulus, and a substantially rectangle-like cross section configuration, taken along a radius of said annulus. The ring shaped blade extends around a central axis of symmetry (y-y) that passes through the center of the annulus and is orthogonal to a plane containing it. A ring shaped blade as above, has two opposing flat faces parallel with each other having the shape of an annulus, and two cutting edges, each corresponding to the greater circumference of the respective face of the annulus.

With particular reference to FIGS. 1 to 10, it will be noted how a system for inspection of a cutting edge of a blade is generally designated by reference numeral 1 and comprises one supporting and moving group 4, mounted for rotation about one rotation axis (x-x) and configured for supporting, between a parking position and a reading position, one ring shaped blade 3 having at least one cutting edge 2, and putting it into rotation about rotation axis x-x. When the ring shaped blade 3 is supported in the reading position, the rotation axis (x-x) is coincident with the central axis of symmetry (y-y) of the ring shaped blade 3. In other words, the supporting and moving group 4 is configured to rotate the ring shaped blade 3 in such a way that, when this is supported by the supporting and moving group 4, it is placed into rotation with the rotation axis (x-x) coincident with the central axis of symmetry (y-y).

Figure 3:
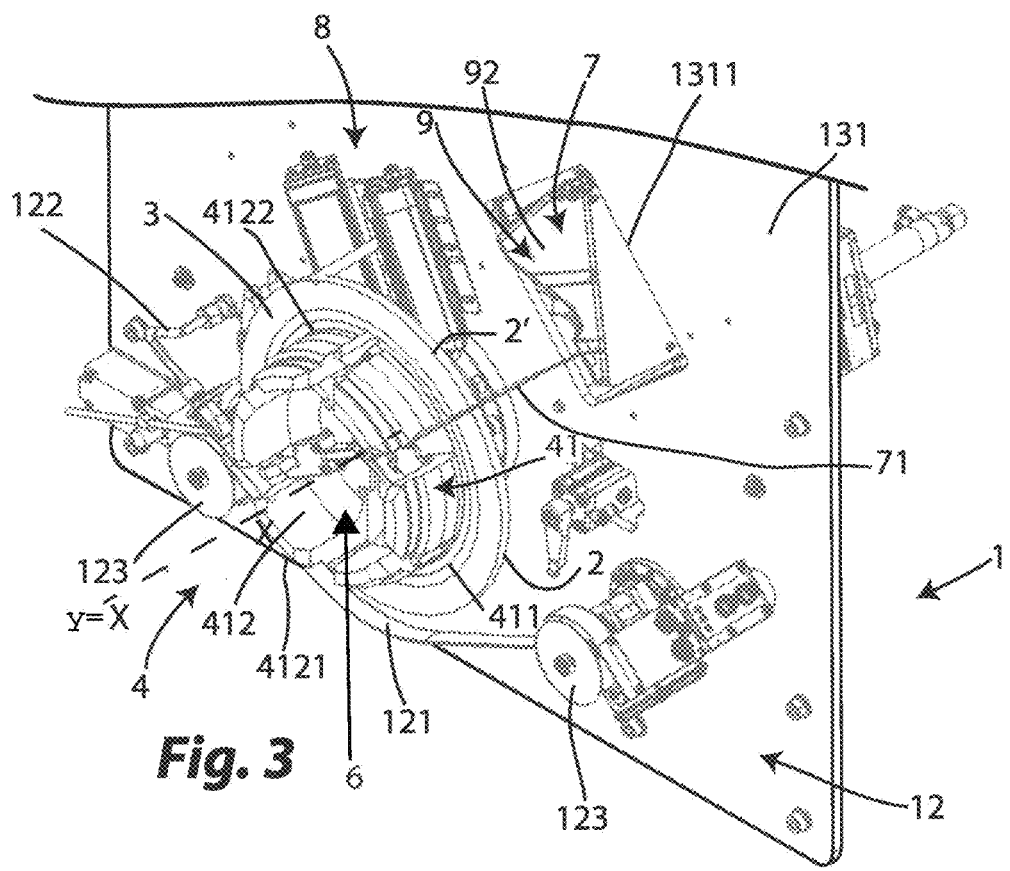
FIG. 3 illustrates a not scaled perspective view of a front lower portion of the inspection system of FIG. 1.

More particularly, the supporting and moving group 4, reference is made in particular to FIGS. 3 and 4, comprises one support element 41 configured for supporting the ring shaped blade 3 and one shaft (not visible in the drawings) orthogonally rigidly fixed, for example keyed or bolted in any suitable way, to the support element 41 along rotation axis x-x. The supporting and moving group 4 of the system 1 according to the invention further comprises one gear motor group 42, operatively connected to the shaft, whereby the activation of the gear motor group 42 drags into rotation, in a way known to the skilled person, the shaft and the support element 41 integral thereto, around rotation axis x-x.

The support element 41, according to the embodiment shown in the figures, comprises one plate 411 (see FIG. 11), which is configured to be rigidly connected to the shaft above, and one peripheral wall 412, extending from plate 411, opposite with respect to the shaft, having one free distal portion and one proximal portion 4122 for connection with the plate 411, whereby one ring shaped blade 3 can be placed on the support element 41, for example by an operator or automatically by a robot suitable for the purpose, in the parking position, on the peripheral wall 412 at the free distal portion 4121, and can be moved, as will be described below, toward the reading position, at the connection proximal portion 4122.

The gear motor group 42 of the invention can be directly connected to the shaft, for example in the case of a brushless motor wherein the rotor is keyed on the shaft. Alternatively, as shown in particular in FIG. 4, the supporting and moving group 4 of the system 1 according to the invention also comprises one mechanical drive 44 between the gear motor group 42 and the shaft which, according to one preferred variant of the invention, inter alia comprises:
- a first pulley, rigidly connected to a drive shaft (the first pulley and drive shaft are not visible in the figures) of the gear motor group 42;
- a second pulley 441, which is rigidly connected to the shaft of the supporting and moving group 4; and
- one transmission belt 442, optionally a toothed one, for connection between the first pulley and the second pulley 441.

The system 1 according to the present invention further comprises a positioning unit 5, configured to move the ring shaped blade 3 between the parking position and the reading position, including, according to the embodiment illustrated in the Figures, one pair of engaging arms 51, arranged on opposite sides with respect to the supporting and moving group 4, as can be clearly seen in FIG. and in FIGS. 5 to 10, wherein each engaging arm 51 of the pair of engaging arms 51 includes one engaging portion 511 and is configured to move between one engagement position, at which the engaging portion 511 can touch the blade 3, when supported by the supporting and moving group 4 (see for example FIGS. 5, 6, 7 and 9), and a disengagement position, at which the engaging portion 511 may not touch the ring shaped blade 3 (see FIG. 8).

The positioning group 5 also comprises one pair of shifting elements 52, wherein each shifting element 52 of the pair of shifting elements 52 is connected to one respective engaging arms 51 described above and is configured to shift the respective engaging arm Si along one direction parallel to the rotation axis x-x, whereby when each engaging arm 51 of the pair of engaging arms 51 is in the engagement position it can touch the blade 3, if the blade is mounted on the supporting and moving group 4 and, after one shift by the respective shifting element 52, it can move the ring shaped blade 3 between the parking position and the reading position or vice versa.

With particular reference to the pair of shifting elements 52, according to the embodiment illustrated in the figures (see in particular FIG. 4), it comprises:
- one pair of guides 521, each arranged parallel to the shaft,
- one pair of slides 522, each slidingly mounted along one respective guide 521 of the pair of guides; and
- one pair of pins 523 (see FIGS. 5 to 9), each pin 523 of the pair of pins being, on one side, hinged on a respective slide 522 of the pair of slides and, on the other side, rigidly connected to the respective engaging arm 51, of the pair of engaging arms, optionally at a portion 512 of the engaging arm 51 opposite to the engaging portion 511, Each engaging arm 51 so connected to the respective pin 523 can therefore rotate between the engagement position and the disengagement position as described above, when the pin to which is connected rotates correspondingly.

Clearly, the person skilled in the art will have no difficulty in understanding how other embodiments alternative to the one described above may be adopted for the positioning group 5, for example comprising pneumatic, hydraulic or electrical grippers, provided that they allow engaging and moving the ring shaped blade 3 from the parking position to the reading position or vice versa, once it is positioned on the supporting and moving group 4 in the parking or reading position.

Advantageously, the system 1 according to the present invention furthermore comprises locking elements 6, configured to lock in position the blade 3, when supported by the supporting and moving group 4, in the reading position. Those locking elements are configured to move between one rest position in which they do not interfere with the blade 3, and one locking position, wherein they lock the blade 3 in position. According to a particularly preferred embodiment of the invention illustrated in the Figures, said locking elements comprise at least one self-centering jaws group 61 housed in a housing seat 413 comprised between the plate 411 and the peripheral wall 412 of the support element 41. According to a preferred embodiment, in the peripheral wall 412 a plurality of recesses 4123 (for example shown in the FIGS. 6 and 8) is formed for this purpose, and the jaws of the self-centering jaws group can be displaced between their rest position, wherein they are included in the housing seat 413, and the locking position, wherein they are each inserted in a respective recess 4123 of the plurality of recesses, so as to extend radially beyond the peripheral wall 412 and thus locking blade 3 in position.

Clearly, other embodiments could be envisaged for the locking elements 6, which may for example comprise electrically operated or non-electrically operated expanders of commercial type, pneumatic or hydraulic expanders.

The system 1 according to the present invention advantageously also comprises one first emitting group 7, configured for emitting at least one first inspection light beam 71 toward the supporting and moving group 4 and, therefore, toward one cutting edge 2 of the ring shaped blade 3 when it is supported by the supporting and moving group 4 in the reading position, and one second emitting group 8, which is also configured for emitting at least one second inspection light beam 81 toward the supporting and moving group 4 and toward the cutting edge of blade 3, when this is supported by the supporting and moving group 4 in the reading position.

The first emitting group 7 is advantageously configured to emit at least one inspection laser beam 71 which strikes blade 3, at its surface having cutting edge 2, according to an angle optionally comprised between 35° and 55° relative to one direction normal to one face of blade 3, advantageously the face of the ring shaped blade 3 facing the emitting group 7 and delimited by the cutting edge 2 under investigation. The aforesaid angle can be more optionally comprised between 40° and 50° and still more optionally can be equal to about 45°. The second emitting group 8 comprises at least one light source of LED type, configured to strike blade 3, at its surface having cutting edge 2, according to one angle optionally not greater than 45', more optionally not greater than 30°, still more optionally not greater than 20° with respect to one direction normal to the face of the blade.

The system 1 according to the invention further comprises a first detecting unit 9, configured to detect the first light beam 71, when the ring shaped blade 3 is supported by the supporting and moving group 4 in the reading position and the first inspection light beam 71 is emitted toward the blade 3, as described above, and reflected by the latter.

The system 1 according to the invention further comprises one second detesting unit 9', configured to detect the second light beam 81, when the ring shaped blade 3 is supported by the supporting and moving group 4 in the reading position and the second inspection light beam 81 is emitted toward the blade 3, as described above, and reflected by the latter.

The first detecting unit 9 and the second detecting unit 9' are both positioned at the supporting and moving group 4 and configured to detect individually or simultaneously the first light beam reflected by the ring shaped blade 3 and the second light beam reflected by said ring shaped blade 3, respectively, when supported by the supporting and moving group 4 in the reading position.

Figure 12:
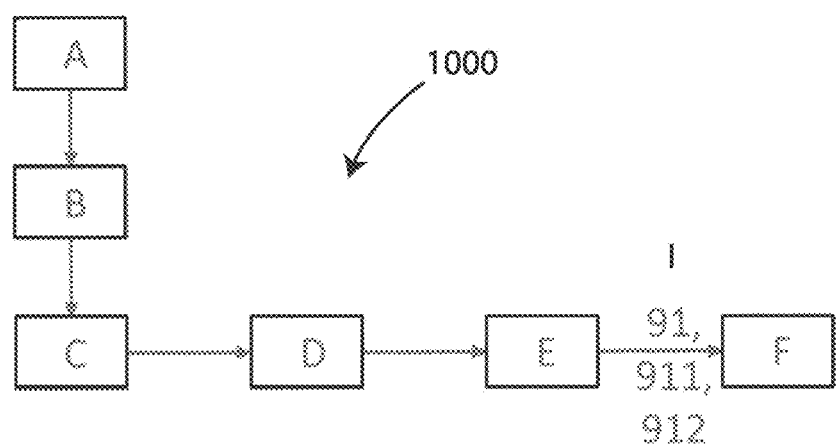
FIG. 12 is a flow chart of the main steps of the inspection method according to the invention.

Each detecting unit 9 and 9' is particularly configured to output at least one corresponding detection signal (indicated with reference numeral 91 in FIG. 12 flow chart) that is transmitted to the input of a control and processing unit (not shown in the figures), which is also included in the system 1 of the invention, which control and processing unit is operatively connected to both the supporting and moving group 4, the first emitting group 7, the second emitting group 8 and, clearly also to the first and second detecting unit 9 and 9', and is configured, as will be seen better hereinafter, both for exchanging with these groups suitable control signals and receiving in input and processing the detection signal 91 and outputting an index I of the quality of the cutting edge 2 of blade 3, according to appropriate analysis algorithms.

The first detecting unit 9 comprises, according to the embodiment illustrated in the Figures, at least one first camera 92, configured to detect the laser beam 71 reflected by the surface of blade 3, at the cutting edge 2, and generate a first detection signal (indicated with reference number 911 in the flowchart of FIG. 12), in the form of at least one image, optionally dependent on the degree of inclination of the impression left by the laser beam 71 on the surface of blade 3. The person skilled in the art will have, in this case, no difficulty in understanding how with term "impression" an area on the ring shaped blade 3 having a regular shape, optionally either circular or elliptical, of precise amplitude or anyway belonging to a quite narrow range, struck by the first inspection light beam 71 emitted and depending on the diameter of that beam is meant.

According to a preferred variant of the invention, the image associated with the first detection signal 911 depicts a cross sectional view of the ring shaped blade 3 under investigation, taken along one plane orthogonal to the face of said blade 3, at its cutting edge 2, struck by the first inspection light beam 71, for example having one inverted "L"-type shape. The person skilled in the art will have no difficulty in acknowledging that the more the edge defined by the inverted "L" will be rounded in the image, the greater will be the level of wear of the inspected blade. An algorithm for assessment of the geometry of the cutting edge 2 of the blade, among many implementable by the control and processing unit of system according to the invention, will be able for example to perform a comparison between the image of the profile of the cutting edge, derived from detection signal 911, and a corresponding "ideal" profile, pre-stored in the system. The greater the difference (for example the area of the image included) between the profile derived from the signal 911 and the ideal one, the greater will be the wear level of the blade under investigation.

The second detecting unit 9' comprises also a second camera 93, configured to detect the LED beam 81 reflected by the stroke surface of the ring shaped blade 3, and generate a second detection signal (indicated with reference number 912 in the flowchart of FIG. 12), in the form of at least one image, optionally correlated on the surface extension of possible unevenness or defects on the surface of blade 3. In fact, in the image derived from the second detection signal 912, a defect on the surface of the blade at the cutting edge 2, caused for example by a crack, will correspond to an area of colour different with respect to the image background, the background being associated to an area of the ring shaped blade 3 which is free from defects, whereby the second inspection light beam 81 emitted by the second emitting group 8 is perfectly reflected and completely detected by the detecting unit 9', while at one defect on the surface of the ring shaped blade 3 a partial reflection of the second inspection light beam 81 emitted by the second emitting group 8 occurs, whereby a different colour on the image, with respect to the background, is obtained.

In this case also, the person of skill in the art will have no difficulty in acknowledging that the more extended the extension of the defect, at the cutting edge 2 of the ring shaped blade 3 under investigation, for example due to cracks that are due to wear in the blade, the greater the area represented in the image derived with a colour different with respect to the background.

Optionally, the system 1 according to the invention also comprises an adjustment group (indicated with reference numeral 10 in FIGS. 4 and 10) of the distance and inclination of the first detecting unit 9 (the first camera 92) and/or the second detecting unit 9' (the second camera 93) with respect to the supporting and moving group 4, so that they can be placed each at an appropriate distance, i.e. to their focal distance, for correct acquisition of the reflected first light beam and reflected second light beam 81, as a function of the size of the ring shaped blade 3 supported by the supporting and moving group 4. Each adjustment group can be obtained in various ways and, according to a preferred embodiment of the invention, can comprise for example:

one or more sliding blocks, slidingly mounted on respective miniaturised guides;

one support carriage, rigidly connected on one side to a respective detecting group (9, 9') and at the other side to one or more of the above mentioned sliding blocks; and one irreversible gear motor group, which can be activated by the control and processing unit and is operatively connected to the sliding blocks, for example by means of one transmission system optionally of the pinion-rack type whereby, thanks to the actuation of the respective gear motor group, the one or more sliding blocks with the respective detecting group (9, 9') can be automatically positioned at a correct focal distance, based on the type of ring shaped blade 3 to be inspected.

In this regard, it should be noted that the activation of the adjustment group 10, can occur:

in response to a preliminary step of analysis of the signal received by the corresponding detecting group (9, 9') if, for example, it is found that it does not satisfy certain qualitative parameters, whereby it is inadequate to provide a reliable result on the cutting edge 2 of the ring shaped blade 3 under investigation; and/or in response to a preliminary step of detection, in any suitable way, of the dimensions of the ring shaped blade 3 under investigation, for example by means of a detected signal, regarding the position of the self-centering jaws 61; and/or in response to one input manually given by an operator, providing the diameter of the ring shaped blade 3 under investigation, to the control and processing unit, for example by means of suitable input/output means such as a keyboard or a mouse connected to a display screen.

The system 1 according to the invention advantageously optionally comprises also one cleaning group 12, configured to clean the ring shaped blade 3 when supported by the supporting and moving group 4 in a reading position, including, according to the embodiment illustrated in the Figures:

at least one belt 121, configured to enter into contact with said blade 3, when it is supported by said supporting and moving group 4 in reading position; and at least one air delivering element 122, configured to emit at least one air flow, optionally of lamellar type, toward blade 3, for the purpose of eliminating any possible processing residue or impurities from its surface, before the detection by the detecting unit 9.

The blade 121, according to one variant of the invention, is supported at each end thereof by a respective motorized roller 123, whereby based on the mutual rotation of each roller 123, said belt can moved from one working configuration, wherein it is tighten and enters into contact with the cutting edge 2, 2' of blade 3, and one rest configuration, wherein the belt does not touch the cutting edge.

Clearly, the belt 121 may be moved between the working configuration and the rest configuration even in other ways, for example through the activation of only one of the motorized rollers 123.

In this case also, for the cleaning of blade 3, variants of the cleaning group can be implemented, for example comprising one or more cleaning pads which are made of a material suitable for the purpose, which pads can be brought into contact with the cutting edge of the ring shaped blade 3 under investigation, for example through suitable pneumatic or hydraulic actuator elements.

The system 1 according to the present invention advantageously also comprises one supporting frame 13 having at least one fixed portion 131, which is configured to support at least the supporting and moving group 4, the positioning unit 5, the locking elements 6, the first emitting group 7, the second emitting group 8, the first detecting group 9 and the second detecting group 9', and the respective adjustment groups 10 and cleaning group 12, if comprised in the system. In this case, each group of system 1 as described above is mounted on the fixed portion of the supporting frame 13 and, depending on the case, can be rigidly fixed thereto, for example bolted, or moveably supported, through suitable bearings, as in the case of the shaft and of the support element 41 of the supporting and moving group 4, which are configured to run, when actuated by the gear motor group 42, about the rotation axis x-x.

Again in this case, the first emitting group 7 and the second emitting group emit the first inspection light beam 71 and the second inspection light beam 81, respectively, toward a cutting edge 2 of blade 3, facing the fixed portion 131 of the supporting frame 13 and in order to allow this, in the fixed portion 131 of the supporting frame 13 respective through openings 1311 are optionally formed, whereby the first emitting group 7 and the second emitting group 8 are mounted on the frame at one rear face thereof, opposite to the face on which the ring shaped blade 3 to be analysed is supported, in use, by the supporting and moving group 4.

Clearly, the support frame may have a quite different shape, that does not require the presence of through openings 1311, for example in the case where it has a frame-like configuration (i.e. comprising uprights and crosspieces and no walls).

According to a variant of the system, the supporting frame 13 also comprises a portion 132, movable with respect to the fixed portion 131, configured to support at least the first emitting group 7 and the second emitting group 8, and the first detecting group 9 and the second detecting group 9' with the related adjustment groups 10, if provided, while the supporting and moving group 4, the positioning group 5, the locking elements 6 and the cleaning group 12, if included in the system, are supported by the fixed portion 131. In this case, the first emitting group 7 and the second emitting group 8 can be configured to emit the first inspection light beam 71 and the second inspection light beam 81, respectively, toward one cutting edge 2' of blade 3, facing away from the fixed portion 131 of the supporting frame 13 or can be configured to emit the respective light beams toward the cutting wire 2 of the ring shaped blade 3 facing toward the fixed portion 131 of the supporting frame 13.

Figure 10:
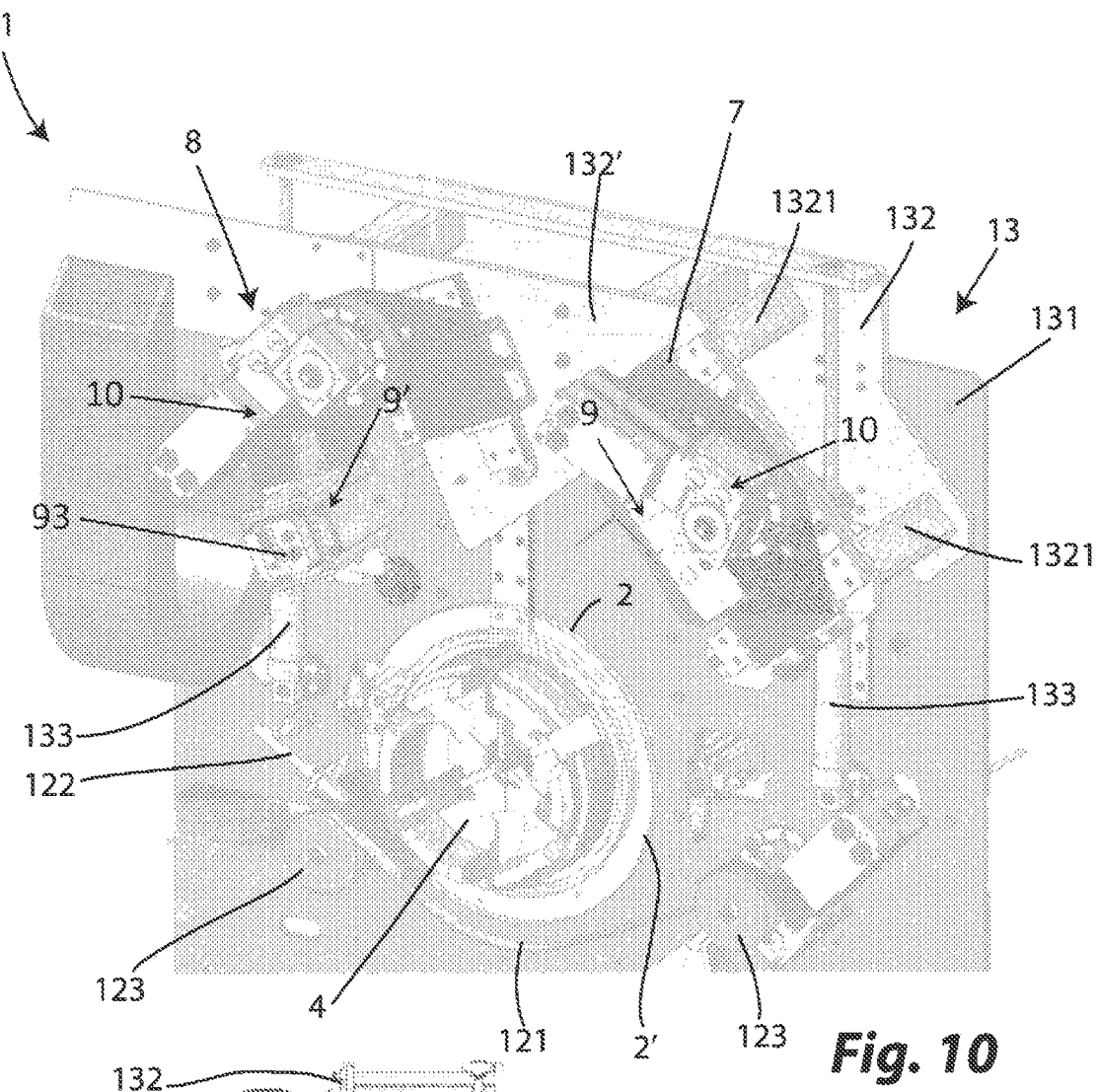
FIG. 10 illustrates a not scaled perspective view of a variant of the inspection system of FIG. 1.
Figure 11:
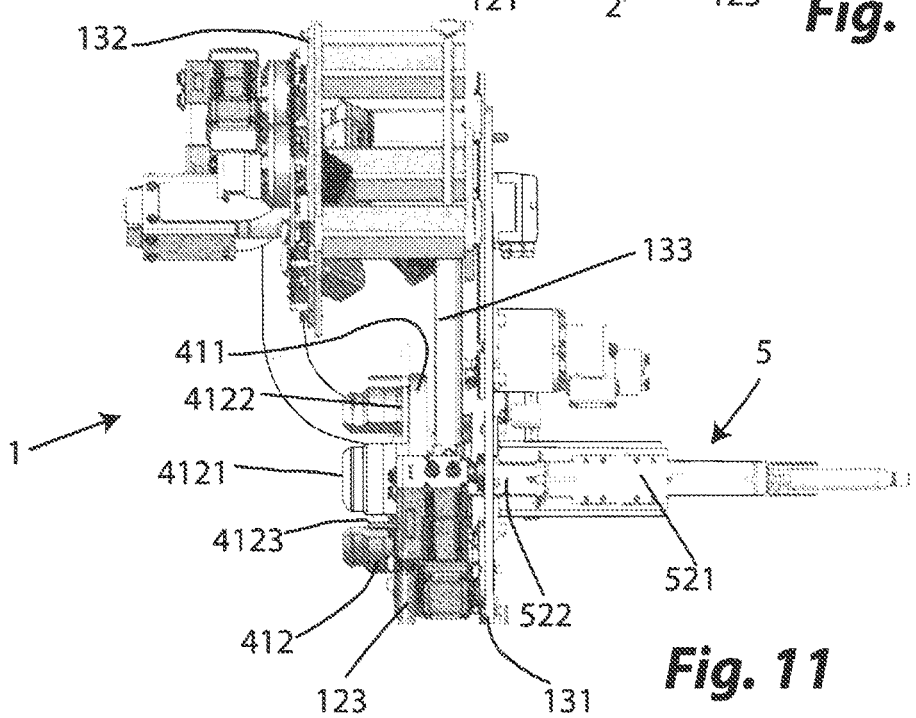
FIG. 11 shows a not scaled lateral view of a variant of the inspection system represented in FIG. 10.

According to the preferred embodiment of the invention, see FIGS. 10 and 11, the fixed portion 131 of the supporting frame 13 is a panel of a boxlike containment body of the system and the movable portion 132 is another plate or panel, movably mounted on the fixed portion 131, optionally parallel thereto, for example by means of suitable telescopic arms 133 or of any other suitable type, that can be operated in a known way for the person skilled in the art, so that the movable portion 132 can be moved between a first working position wherein it is spaced apart from the supporting and moving group 4 and therefore it leaves to an operator or a robot a space sufficient for arranging one ring shaped blade 3 to be inspected on the supporting and moving group 4, and a second working position, wherein it is at a correct distance from the supporting and moving group 4 and from the blade 3, when the blade is mounted on that group, for example the focal distance for the carried first detecting unit 9 and the second detecting unit 9', and allows for the emission of the respective inspection light beams 71 and 81 by the first and second emitting group toward the cutting edge 2'.

In the embodiment of FIGS. 10 and 11, in particular, the movable portion also includes a second plate 132', arranged parallel to plate 132 and connected thereto through suitable spacers 1321, whereon emitting groups 7 and 8 of the system 1 of the invention are mounted.

It is quite evident how the inspection system of the invention may comprise one plurality of supporting and moving groups 4, operatively connected to respective positioning groups 5, locking elements 6, emitting groups 7 and 8 and detecting groups 9 and 9', as well as a respective adjustment groups 10 and cleaning groups 12, so that a first set of such groups may be configured to inspect the quality of a cutting edge 2 of one blade and another set can be configured to inspect the quality of the other cutting edge 2' of the same blade. It is also evident that it can be incorporated in a plant that is more complex and used automatically and in line for inspecting the quality of the cutting edge of the blades used in the plant, Such a system can be easily employed for implementing a method for inspecting the quality of the cutting edge of a blade, the flowchart of FIG. 12, comprising the operating steps below, being a schematic representation thereof.

In an initial step A, one ring shaped blade 3 to be inspected is arranged in parking position, on the supporting and moving group 4 of the system 1 of the invention.

Then, at step B, the ring shaped blade 3 is brought into reading position by the positioning group 5, which, through a translation of the slides 522, on corresponding guides 521, away from the fixed portion 131 of the frame 13 and the rotation of the engaging arms 51, can place the engagement portions 511 of the engaging arms 51 at the ring shaped blade 3 (engagement position) whereby, through a subsequent translation in the opposite direction, i.e. toward the fixed portion 131 of the frame 13, the blade is pushed in reading position by the engaging portions 511 of the engaging arms 51.

Then, at the step C, the ring shaped blade 3 is locked in position by locking elements 6, in this specific case by the plurality of jaws 61. In a subsequent step D, the ring shaped blade 3 is cleaned:
  by activating the cleaning group 12, which tightens belt 121 and starts the delivery of air through delivering element 122, and
  by rotating the ring shaped blade 3 through the activation of the gear motor group 42,
  whereby, the ring shaped blade 3 rotates around rotation axis x-x and the cutting edge 2 or 2', in contact with the belt 121 and with the air delivered by the delivering element 122, is cleaned of any processing residues or impurities thereon.

Optionally, at step D of the method, the heft 121 of the cleaning group can then be relaxed, letting free the ring shaped blade 3 thereby cleaned.

At step E, which can occur after step D or simultaneously therewith, the first and second detecting groups 9 and 9' are positioned at the correct focal distance, for example through use of respective adjustment groups 10 described above and, if the first and second emitting groups are mounted on the movable portion 132 of the supporting frame 13, also through movement of the movable portion 132 with respect to the fixed portion 131, and the inspection procedure of the cutting edge of blade 3 is started, which comprises:
  the activation sequentially or simultaneously of the first and second emitting group 7 and 8 which respectively emit a first inspection signal 71 and a second inspection signal 81, the activation of the first and second detecting group 9 and 9', the detection by the first and second detecting group 9 and 9', of the first light signal and the second light signal reflected from blade 3, respectively, the emission of the signal or signals (91, 911, 912) output from the first and second detecting group 9 and 9', and the processing of such signals, in a way known to the person skilled in the art, by the control and processing unit and the output of an index I indicative of the quality of a cutting edge 2 of the inspected ring shaped blade 3.

It should be noted that the step E of the method described above takes place with the ring shaped blade 3 placed in rotation around axis x-x of the supporting and moving group.

Once the procedure for inspecting the cutting edge is completed, at step F the rotation of the ring shaped blade 3 under investigation is stopped and the locking elements 6 are activated once again, which move to the rest position and release blade 3, the blade being able to be moved between the reading position and the parking position. Therefore, through activation of the positioning group and activation in particular of engaging arms 51 and shifting elements 52, the engaging arms 51 are positioned with their engaging portion 511 at the ring shaped blade 3 and comprised between the fixed portion 131 of the supporting frame 13 and the blade 3, whereby a subsequent translation of the slides 522 of the shifting elements 52 away from the fixed portion 131 of the frame 13 causes the engagement of the ring shaped blade 3 and its displacement in parking position, wherein an automatic robot can take it, for example in order to store it in a suitable storage or send it to repair line, for example in the case in which the outcome of the procedure for inspection of the cutting edge 2 of the ring shaped blade 3 is negative, in the sense that defects are found on the cutting edge of the inspected blade (the index I so determined has a value that is lower than a certain threshold), whereby the blade must be discarded or repaired.

The procedure for inspecting the quality of the cutting edge of a blade, as implemented by the present invention, provides for the output of a quality index I, which is compared with reference threshold values (in a number that can be changed according to the requirements of the operator), whereby, for example, the following cases can be distinguished:

1) blade with intact cutting edge, sharpened at 90%;
2) blade with intact cutting edge, sharpened at 70%;
3) blade to be discarded with no intact cutting edge and/or blade no longer sharpened (<70%).

As regards the values assigned to each threshold, they may be predetermined and/or can be changed based on the application. So, for example, if a blade must be used for machining sheets of a thin material, such that a high quality of the cutting edge is required, the percentage threshold value (%) will be different and higher than if the blade would be used for machining sheets of material having greater thickness.

In view of the above it is quite evident that the system for inspection of a cutting edge of a blade, and the respective inspection method, according to the present invention, overcome the drawbacks described in the introduction. They, in fact, provide for the possibility to automatically, simply and reliably inspect the cutting edge of a blade, with the result that it is possible to avoid the drawback of wasting material due to poor quality of the cutting edge used for machining of the same.

The system described above can be in fact integrated in a processing plant and the inspection of blades used by the plant can be performed automatically, reliably and accurately (because the intervention of the operator can be avoided), in line and therefore consistently, with no waste of time and material.

In the foregoing the preferred embodiments were described and some modifications of the present invention have been suggested, but it should be understood that those skilled in the art can make modifications and changes without departing from the relative scope of protection, as defined by the appended claims.

Thus, for example, the first inspection light beam 7 can also be a non-laser beam. It can be, for example, a light beam of the LED or neon type, so-called negatively obtained, i.e. configured to stroke for example a suitable wire, whose shadow produces the same effect of a laser beam on the illuminated ring shaped blade 3.

The invention claimed is:

1. Automatic system for inspecting one cutting edge of a ring shaped blade, wherein said ring shaped blade is configured to be used in a plant for cutting one sheet of metallic material and extends around a central symmetry axis, said system comprising:

one supporting and moving group rotatably mounted around one rotation axis and configured to support said ring shaped blade between at least one parking position and at least one reading position and for putting it in rotation around said rotation axis, wherein when said ring shaped blade is supported in said at least one reading position, said rotation axis is coincident with said central symmetry axis of said ring shaped blade;

one first emitting unit, configured to emit at least one first inspection light beam toward said supporting and moving group and toward said cutting edge of said ring shaped blade, when said ring shaped blade is supported by said supporting and moving group in said at least one reading position;

one second emitting unit, configured to emit at least one second inspection light beam toward said supporting and moving group and toward said cutting edge of said ring shaped blade, when said ring shaped blade is supported by said supporting and moving group in said at least one reading position;

one first detecting unit, configured to detect a first light beam reflected from said ring shaped blade, when said first inspection light beam is emitted toward said ring shaped blade, and one second detecting unit, configured to detect a second light beam reflected from said ring shaped blade, when said second inspection light beam is emitted toward said ring shaped blade, said first detecting unit and said second detecting unit being both positioned at said supporting and moving group and configured to detect, individually or simultaneously, said first light beam reflected from said ring shaped blade and second light beam reflected from said ring shaped blade, respectively, when supported by said supporting and moving group in said at least one reading position and output at least one respective detection signal;

one control and processing unit operatively connected to said supporting and moving group, said first emitting unit, said second emitting unit, said first detecting unit and to said second detecting unit, configured to receive and process said at least one respective detection signal, and output at least one quality index of the cutting edge of said ring shaped blade.

2. The automatic system according to claim 1, wherein said supporting and moving group comprises:
   one support element, configured to support said ring shaped blade;
   one shaft orthogonally rigidly fixed to said first support element along said at least one rotation axis;
   one gear motor group, operatively connected to said at least one shaft, whereby the activation of said gear motor group drags into rotation said shaft and the support element integral thereto, around said at least one rotation axis.

3. The automatic system according to claim 2, wherein said support element comprises:
   one plate, configured to be rigidly connected to said shaft, and
   one peripheral wall, extending from said plate, opposite with respect to said shaft, said peripheral wall having one free distal portion and one proximal portion for connection with said plate, whereby said ring shaped blade can be placed on said support element in said parking position, on said at least one peripheral wall at said free distal portion, and can be moved toward said reading position, at said connection proximal portion of said peripheral wall.

4. The automatic system according to claim 3, comprising locking elements, configured to lock in position said ring shaped blade, when supported by said supporting and moving group, at said reading position, by moving between at least one rest position wherein they do not interfere with said ring shaped blade and at least one locking position, wherein they lock in position said ring shaped blade.

5. The automatic system according to claim 4, wherein said locking elements comprises at least one plurality of self-centering jaws housed in a housing seat comprised between said plate and said peripheral wall of said support element, within said peripheral wall being formed one plurality of recesses, wherein said jaws of said plurality of self-centering jaws can be displaced between said rest position, wherein they are included within said housing seat, and said locking position, wherein each is inserted in one respective recess of said plurality of recesses in such a way as to radially extend beyond said peripheral wall, thereby locking in position said ring shaped blade.

6. The automatic system according to claim 1, comprising at least one positioning group, configured to move said ring shaped blade between said at least one parking position and said at least one reading position, comprising:
   one pair of engaging arms, located on the opposite side with respect to said supporting and moving group, wherein each engaging arm of the pair of engaging arms includes at least one engaging portion and is configured to be movable between one engagement position, at which said engaging portion of each engaging arm can touch said ring shaped blade, and one disengagement position, at which said engaging portion of each engaging arm cannot touch said ring shaped blade;
   one pair of shifting elements, wherein each shifting element of the pair of shifting elements is connected to one respective engaging arms of the pair of engaging arms and is configured to shift the respective engaging arm along one direction parallel to said at least one rotation axis, whereby when each engaging arm of the pair of engaging arms is in the engagement position it can touch said ring shaped blade, if the ring shaped blade is mounted on said at least one supporting and moving group and, after one shift by the respective shifting element it can move said ring shaped blade between said parking position and said reading position.

7. The automatic system according to claim 5, wherein said pair of shifting elements comprises:
   at least one pair of guides, each arranged parallel to said at least one shaft,
   at least one pair of slides, each capable of sliding along one respective guide of said pair of guides;
   at least one pin, hinged on one respective slide on one side and on the other side rigidly connected to one respective engaging arm of said pair of engaging arms, each engaging arm thus being connected to the respective pin and being therefore able to rotate between said engagement position and said disengagement position, when the pin to which it is connected rotates correspondingly.

8. The automatic system according to claim 6, comprising locking elements, configured to lock in position said ring shaped blade, when supported by said supporting and moving group, at said reading position, by moving between at least one rest position wherein they do not interfere with said ring shaped blade and at least one locking position, wherein they lock in position said ring shaped blade,
   further comprising one supporting frame having one fixed portion, said fixed portion being configured to support said supporting and moving group, said positioning group, said locking elements, said first emitting unit, said second emitting unit, said first detecting unit, said second detecting unit and, said first emitting unit, said second emitting unit being configured to emit said first inspection light beam and said second inspection light beam, respectively, toward said cutting edge of said ring shaped blade facing said fixed portion of the supporting frame.

9. The automatic system according to claim 8, comprising an adjustment group of the distance and inclination of said first detecting unit and/or said second detecting unit with respect to said supporting and moving group, said first detecting unit and said second detecting unit being configured so as to be positioned each at a focal distance, which distance is configured for the correct acquisition of said first reflected light beam and said second reflected light beam, based on the dimensions of said ring shaped blade,
   wherein said fixed portion is configured to support said adjustment group.

10. The automatic system according to claim 8, comprising one cleaning group configured to clean said ring shaped blade when supported by said supporting and moving group, said cleaning group comprising:
   one belt configured to enter into contact with said ring shaped blade, when supported by said supporting and moving group in said reading position; and
   one air delivering element, configured to deliver at least one air flow toward said ring shaped blade;
   wherein said fixed portion is configured to support said cleaning group.

11. The automatic system according to claim 6, comprising locking elements, configured to lock in position said ring shaped blade, when supported by said supporting and moving group, at said reading position, by moving between at least one rest position wherein they do not interfere with said ring shaped blade and at least one locking position, wherein they lock in position said ring shaped blade,
   further comprising one supporting frame having one fixed portion and at least one movable portion with respect to said fixed portion, said fixed portion being configured to support said supporting and moving group, said positioning group, said locking elements and said movable portion being configured to support at least said first emitting unit, said second emitting unit, said first detecting unit, said second detecting unit, whereby said first emitting unit and said second emitting unit emit said first inspection light beam and said second inspection light beam, respectively, toward the other cutting edge of said ring shaped blade, which faces away from said fixed portion of the supporting frame.

12. The automatic system according to any claim 11, comprising one cleaning group configured to clean said ring shaped blade when supported by said supporting and moving group, said cleaning group comprising:
   one belt configured to enter into contact with said ring shaped blade, when supported by said supporting and moving group in said reading position; and
   one air delivering element, configured to deliver at least one air flow toward said ring shaped blade;
   wherein said fixed portion is configured to support said cleaning group.

13. The automatic system according to claim 11, an adjustment group of the distance and inclination of said first detecting unit and/or said second detecting unit with respect to said supporting and moving group, said first detecting unit and said second detecting unit being configured so as to be positioned each at a focal distance, which distance is configured for the correct acquisition of said first reflected light beam and said second reflected light beam, based on the dimensions of said ring shaped blade;
   wherein said movable portion is configured to support said adjustment group.

14. The automatic system according to claim 1, wherein said first inspection light beam is a laser beam which strikes said ring shaped blade (3), at said at least one cutting edge, according to an angle comprised between 35° and 55°, with respect to one direction normal to one face of said ring shaped blade facing said first emitting unit and being delimited by said cutting edge under investigation.

15. The automatic system according to claim 1, wherein said first detecting unit comprises at least one first camera configured to detect a first laser light beam reflected by the surface of said ring shaped blade hit by said first inspection light beam in the form of a laser beam and generate one first detection signal, in the form of at least one image, which can be correlated to the degree of inclination of the impression left by said first laser light beam hitting the surface of said ring shaped blade.

16. The automatic system according to claim 1, wherein said second inspection light beam is a LED beam configured to strike said ring shaped blade, at said at least one surface having its cutting edge, according to one angle not greater than 45°, with respect to one direction normal to one face of said ring shaped blade facing said second emitting unit and delimited by said cutting edge under investigation.

17. The automatic system according to claim 1, wherein said second detecting unit comprises at least one second camera configured to detect said second light beam reflected by the surface of said ring shaped blade hit by said second inspection light beam and generate said at least one second detection signal, in the form of at least one image.

18. The automatic system according to claim 1, comprising an adjustment group of the distance and inclination of said first detecting unit and/or said second detecting unit with respect to said supporting and moving group, said first detecting unit and said second detecting unit being configured so as to be positioned each at a focal distance, which distance is configured for the correct acquisition of said first reflected light beam and said second reflected light beam, based on the dimensions of said ring shaped blade.

19. The automatic system according to claim 1, comprising one cleaning group configured to clean said ring shaped blade when supported by said supporting and moving group, said cleaning group comprising:
   one belt configured to enter into contact with said ring shaped blade, when supported by said supporting and moving group in said reading position; and
   one air delivering element, configured to deliver at least one air flow toward said ring shaped blade.

20. The automatic system according to claim 19, wherein said at least one belt is supported at each end thereof by a respective motorized roller, whereby based on the mutual rotation of each roller, said belt can move from one working configuration, wherein it enters into contact with said cutting edge of said ring shaped blade, to one rest configuration, wherein the belt does not touch said cutting edge.

* * * * *